(12) United States Patent
Ikegame

(10) Patent No.: US 6,342,977 B1
(45) Date of Patent: Jan. 29, 2002

(54) SUBSTRATE WITH CHECK-LAND, AND CHECK-LAND CONNECTING DEVICE

(75) Inventor: Tetsuo Ikegame, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/271,139

(22) Filed: Mar. 17, 1999

(51) Int. Cl.[7] .............................. G02B 7/02; G11B 9/00; G01R 31/02
(52) U.S. Cl. ........................ 359/813; 369/126; 324/754; 324/758
(58) Field of Search .............................. 369/53.1, 53.38, 369/53.43, 53.44, 53.45, 126, FOR 108; 359/813; 324/512, 513, 515, 527, 754, 755, 757, 758, 555

(56) References Cited

FOREIGN PATENT DOCUMENTS

| JP | 5-189796 | | 7/1993 | | |
|---|---|---|---|---|---|
| JP | 06294990 | A * | 10/1994 | ............ | G03B/17/02 |
| JP | 11186682 | A * | 7/1999 | ............ | H05K/1/11 |

OTHER PUBLICATIONS

Nikkei Byte/Sep. 1997, pp. 148–151, published by Nikkei Business Publications.
Nikkei Electronics, No. 699, Sep. 22, 1997; pp. 13–14.

* cited by examiner

Primary Examiner—Georgia Epps
Assistant Examiner—David N. Spector
(74) Attorney, Agent, or Firm—Frishauf, Holtz, Goodman, Langer & Chick, P.C.

(57) ABSTRACT

A substrate with a check-land, comprises a substrate which is fixed to a housing holding an optical element, and includes a check-land. A portion of the substrate, which includes the check-land, is formed to have a flexibility in relation to the other portion which does not include the check-land. Further, a check-land connecting device used for electrical connection to the check-land of the substrate with a check-land, includes a probe which is used to press a check-land of the substrate with a check-land, and a base member which is used to abut a region of a back surface of the substrate with a check-land, the region corresponding to the check-land. The probe and the base member are connected to approach and separate from each other.

9 Claims, 2 Drawing Sheets

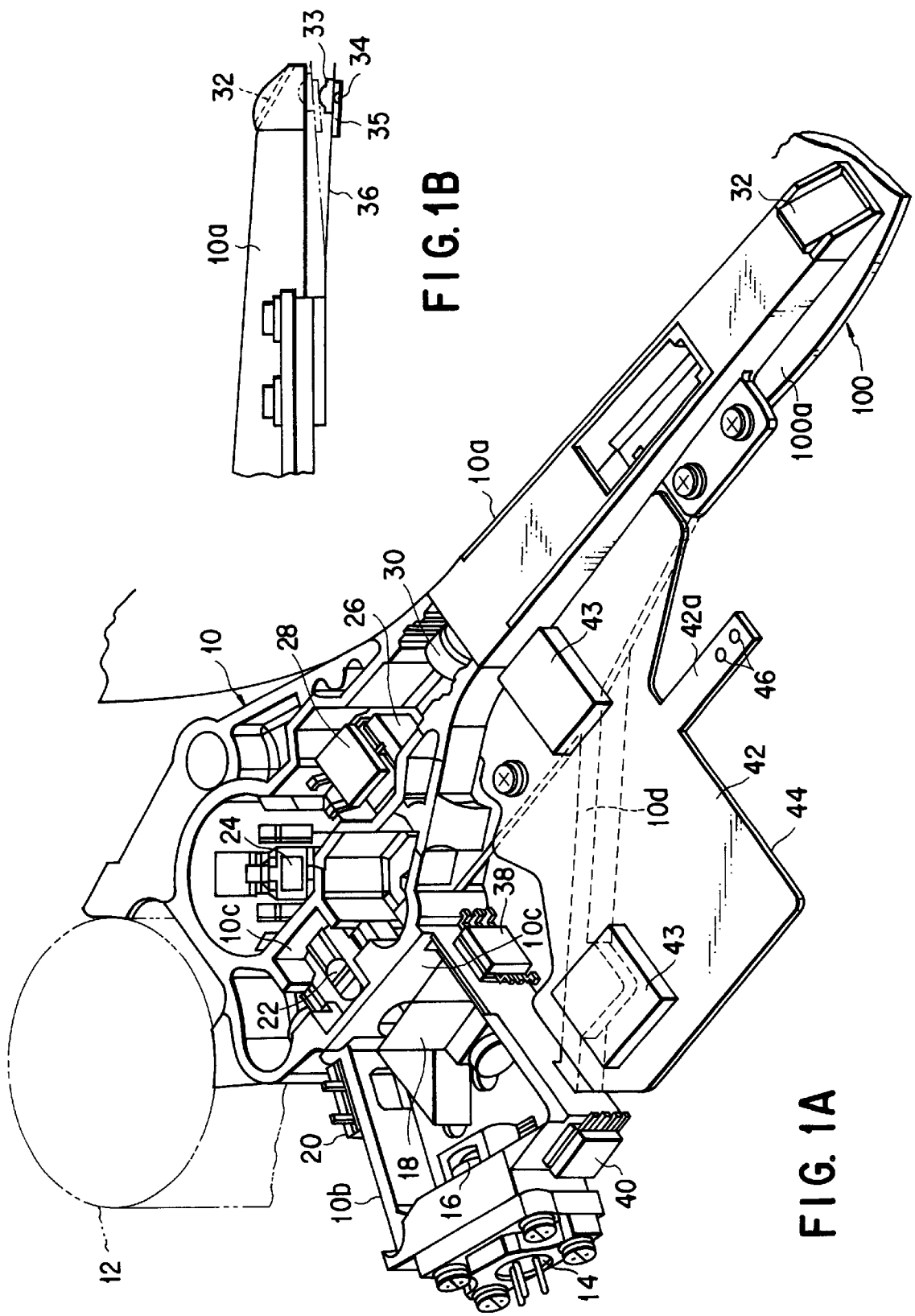

SUBSTRATE WITH CHECK-LAND, AND CHECK-LAND CONNECTING DEVICE

BACKGROUND OF THE INVENTION

The present invention relates to a substrate with a check-land, which is fixed to a housing holding an optical element, and a check-land connecting device used for an electrical connection to a check-land of a substrate with a check-land.

A substrate with a check-land of the above described type is well-known. The check-land is used to check an electrical circuit as to whether it can normally operate or not after the electrical circuit is structured on a substrate in a manufacturing process of an electric circuit board, or to check an apparatus using an electric circuit board as to whether the apparatus can operate normally or not when the electric circuit board is mounted on the apparatus. Further, the check-land is used to measure an output of a photo detector, which includes optical elements, so as to adjust the optical elements and check an erroneous displacement of an optical axis of any one of the optical elements.

The above described checking operation is carried out by bringing a probe of a test device into contact with the check-land. The probe functions as a check-land connecting device used to electrically connect the test device to the check-land.

When the probe of the test device is brought into contact with the check-land, a pressure force of about several tens of grams per one probe is applied on the respective check-land to ensure an electrical connection between them, and therefore the substrate is warped. If the substrate is warped, a housing to which the substrate is fixed is accordingly warped. In this case, where the housing holds an optical element, the warping of the housing may cause a warping of the optical element or cause an erroneous displacement of an optical axis. However, if the pressure force applied to the probe is reduced to avoid the warping of the substrate, the electrical connection becomes unstable so that errors contained in measured electrical signals or optical characteristics becomes large. Therefore, in a case where a housing to which a substrate with a check-land is fixed, holds an optical element, a checking operation using the check-land must be carried out very carefully. Consequently, the checking operation requires relatively much time.

The present invention has been derived from the above-described circumstances, and an object of the present invention is to provide a substrate with a check-land, which can perform a checking operation via the check-land easily and accurately in a short time, even in a case where a housing to which the substrate with a check-land, holds an optical element.

Another object of the present invention is to provide a check-land connecting device which is suitable to be used for an electrical connection to the check-land of the substrate with a check-land, the substrate having the above-described structure according to the present invention.

BRIEF SUMMARY OF THE INVENTION

In order to achieve the above described object of the present invention, a substrate with a check-land according to the present invention, is fixed to a housing holding an optical element, and has a checkland, a portion of the substrate, which includes the check-land, has a flexibility with respect to the other portion which does not include the check-land.

With the substrate with the check-land according to the present invention and having the above-described structure, when pressing the check-land with a probe of a test device, it is possible to place an opposite surface of the check-land portion on a receiving table, the opposite surface facing in a direction opposite to a direction in which the check land faces. Then, the probe can be pressed onto the check-land at a desired pressure force necessary to perform a checking operation while the check-land portion of the substrate with the check-land is placed on the receiving table.

Even if the portion of the substrate, which includes the check-land, is warped with respect to the other portion which does not include the check-land due to a pressure generated by the placement of the check-land portion on the receiving table and a pressure applied from the probe, such warping of the check-land portion of the substrate is not propagated to the other portion due to a flexibility of the check-land portion.

Consequently, the substrate is not warped by the above described desired pressure force applied to the check-land via the probe, and therefore the housing to which the substrate is fixed does not warp. In the case where the housing holds the optical element, the warping of the optical element or the erroneous displacement of the optical axis of the optical element, which is caused by the warping of the housing, does not occur.

Further, since the probe is pressed on the check-land at the above described desired pressure force, the electrical connection between them can be assured, and therefore it is possible not to generate errors in measured electrical signals or optical characteristics.

Therefore, even in the case where the housing to which the substrate with the check-land is fixed, holds the optical element, the checking operation using the check-land can be performed easily and accurately within a short time.

In the substrate with a check-land, having the above-described structure and according to the present invention, the housing may hold optical elements including a laser light source and a solid immersion lens, and may be used to record information on a recording layer of an optical disk and to reproduce information from the recording layer, by applying a laser beam from the laser light source to the recording layer of the optical disk via the solid immersion lens.

It is preferable that the substrate with a check-land, having the above-described structure and according to the present invention, includes a flexible substrate and a reinforcing plate attached to the flexible substrate, and the check-land is arranged in a portion of the flexible substrate, which does not correspond to the reinforcing plate.

In the above-described structure, even in the case where the reinforcing plate is attached to the flexible substrate to protect circuit wirings formed on the flexible substrate, the checking operation using the check-land can be performed easily and accurately within a short time.

In the substrate with a check-land, having the above-described structure and according to the present invention, it is preferable that the portion which includes the check-land is formed to project from the other portion which does not include the check-land.

Such a substrate with a check-land is simple in its structure.

In the substrate with a check-land, having the above-described structure and according to the present invention, it is preferable that the portion which includes the check-land is formed integral with the other portion which does not include the check-land.

Such a substrate with a check-land is a simple in its structure.

In the substrate with a check-land, having the above-described structure and according to the present invention, the portion which includes the check-land may have a connection region connecting a region surrounding the check-land to the other portion which does not include the check-land, and outer dimensions of the connection region can be made smaller than outer dimensions of the region surrounding the check-land.

In the substrate with a check-land, having the above-described structure and according to the present invention, the portion which includes the check-land can be partially separated by a slit from the other portion which does not include the check-land.

In order to achieve the above-described object of the present invention, it is preferable that the check-land connecting device used for electrical connection to a check-land of a substrate with a check-land, includes: a probe used to be pressed on the check-land of the substrate with the check-land; and a base member used to be abutted to a region of a rear surface of the substrate with the check-land, the region of the rear surface being opposed to the check-land but corresponding to the check-land, wherein the probe and the base member are connected to be mutually approachable and separatable.

Additional objects and advantages of the invention will be set forth in the specification which follows, and in part will be obvious from the description, or may be learned by practice of the invention. The objects and advantages of the invention may be realized by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments below, serve to explain the principles of the invention.

FIG. 1A is a perspective view schematically showing a housing to which a substrate with two check-lands according to an embodiment of the present invention, is fixed, and which holds optical elements;

FIG. 1B is an enlarged side view of an extending end portion of the housing shown in FIG. 1A;

Figure 2A:
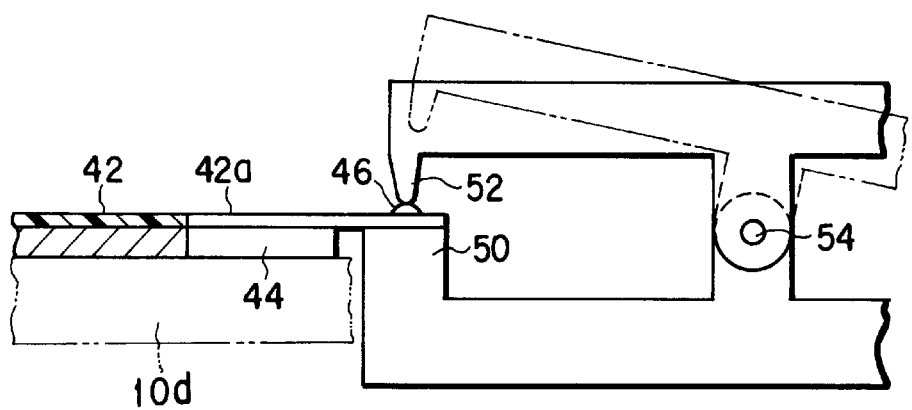
FIG. 2A is a side view schematically showing a check-land connecting device according the embodiment of the present invention and the substrate with the check-lands shown in FIG. 1A in a state in which the connecting device is connected to the check-land of the substrate, a past of the substrate being cut out.

The following are detailed descriptions of the embodiment and various modifications of the present invention, with reference to the above accompanying drawings.

DETAILED DESCRIPTION OF THE INVENTION

A housing 10 shown in FIG. 1A is an optical element holding arm which is used for a magneto-optical disk drive, a writing-once-type disk drive, a phase change type disk drive or the like, and is capable of holding various optical elements used for recording and/or reproducing information on or from an optical recording medium, such as optical recording medium such as CD-ROM, DVD, optical card or the like. The housing 10 is moved relatively with the optical recording medium for performing the above described recording and/or reproduction.

More specifically, the housing 10 is used to record information on a recording layer 100a on a surface of an optical disk 100 by using a very fine laser beam produced by further concentrating a laser beam from a laser light source via a floating-type solid immersion lens (SIL) disclosed in Jpn. Pat. Appln. KOKAI Publication No. 5-189796, or to reproduce information based on a reflected laser beam reflected from the recording layer 100a of the recording layer 100a. The optical recording/reproduction technique which uses such a floating-type solid immersion lens is known from, for example, the September 1997 edition of "NIKKEI Byte" and the Sep. 22, 1997 edition of "NIKKEI Electronics", both published by "Nikkei Business Publications Inc.", of Japan.

The floating-type solid immersion lens floats from the recording layer 100a formed on the surface of the optical disk 100, as a magnetic head for a conventional hard disk device, at a height between about 100 nm and 150 nm, due to a wind generated by a rotation of the optical disk 100. A conventional optical recording/reproduction method in which an optical head is separated by 1 mm or more from a surface of the optical disk which is, for example, CD, DVD, or the like, is called as a "far field recording", whereas an optical recording/reproduction method using the floating-type solid immersion lens, is called as a "near field recording".

In the near field recording, it is possible to make the diameter of a light beam used for recording or reproduction is set to about 1/10 of that of a light beam used for recording or reproduction in the far field recording. Consequently, it is possible that a recording density in the near field recording can be increased about 10 times as high as a recording density in the far field recording.

The housing 10 is made of a light-weight and highly rigid material such as magnesium alloy, and is formed into an L-letter shape approximately. An outer surface of an intersecting portion between long and short two arms 10a and 10b which constitute the L-letter shape, is removably fixed to an output shaft 12 of a voice coil motor. The structure of the voice coil motor is similar to a voice coil motor used to operate an arm which supports the magnetic head in the conventional hard disk device.

A most part of an upper surface of the housing 10, except for the long arm 10a, is opened. The opening of the upper surface is partitioned into several chambers by several partition walls 10c each having a beam transmission hole. The partition walls 10c reinforce the rigidity of the housing 10. The long arm 10a of the housing 10 is opened in the upper and lower surface alternately and intermittently. This structure decreases the weight of the long arm 10a, and prevents the rigidity of the long arm 10a from lowering. A reinforcing rod 10d is arranged to be inclined, between an outer surface of an inner wall of the long arm 1 of the housing 10 and an outer surface of an inner wall of the short arm 10b. Both ends of the reinforcing rod 10d are fixed to the outer surfaces of these inner walls, so that the reinforcing rod 10d serve to increase a mutual rigidity between the long and short arms 10a and 10b.

On an end wall of the short arm 10b of the housing 10, a laser diode 14 and a condenser lens device 16 are supported. The laser diode 14 is operated by a laser oscillation circuit (not shown) housed in an electro-magnetic wave sealed case (not shown), to output a laser light diverging elliptically into the chamber of the short arm 10b of the housing 10. The condenser lens device 16 makes the laser light output from the laser diode 14 and diverging elliptically, become a parallel laser beam having an elliptic cross section. On an inner surface of a bottom wall in the chamber of the short arm 10b of the housing 10, a prism assembly 18 is provided. The prism assembly 18 is structured by combing a prism, a plurality of beam splitters and the like together. The parallel laser beam having the elliptic cross section and output from the condenser lens device 16 is introduced into the prism of the prism assembly 18 and is converted into a parallel laser beam having a circular cross section. Then, the parallel laser beam having a circular cross section is split into two by a beam splitter provided adjacent to the prism.

One of the split parallel laser beams is guided to a beam transmission hole made in an outer wall of the short arm 10b, and then received by a photo-detector 20 for monitoring, which is set in the beam transmitting hole. The other split parallel laser beam is guided to beam transmission holes made in two partition walls 10c (the first and second partition walls) located between the chamber of the short arm 10b and the chamber of the intersecting region at which the long and short arms 10a and 10b intersect each other.

A relay lens device 22 is provided between the first partition wall 10c and the second partition wall 10c. The reply lens device 22 transforms the parallel laser beam having a circular cross section and output from the prism assembly 18, into a converged very fine laser beam, and guides the converged laser beam to a Galvano mirror device 24 provided on an inner surface of a bottom wall in the chamber of the intersecting region between the long and short arms 10a and 10b. The Galvano mirror device 24 reflects the converged laser beam from the relay lens device 22, towards a half prism 26 provided at a proximal portion of a slender chamber of the long arm 10a of the housing 10.

The half prism 26 guides a part of the converged laser beam from the Galvano mirror device 24 to a monitoring photo-detector 28 provided on an upper surface of the half prism 26. Further, the half prism 26 guides the rest of the converged laser beam to an image lens device 30 provided in the slender chamber of the long arm 10a at a position closer to a terminal end of the long arm 10a than the half prism 26. The image lens device 30 converts the converged very fine laser beam back into a parallel laser beam having a circular cross section, and guides the parallel laser beam to a reflection mirror 32 situated at the terminal end of the slender chamber of the long arm 10a of the housing 10. The reflection mirror 32 directs the parallel laser beam from the image lens device 30 downwards.

An objective lens 33 and a solid immersion lens (SIL) 34 are arranged under the reflection mirror 32, as can be seen in FIG. 1B. The objective lens 33 and the solid immersion lens 34 are supported by a slider 35, and the slider 35 functions as a slider for supporting a magnetic head in the conventional hard disk apparatus. The slider 35 is supported by the long arm 10a of the housing 10 via a slider support spring 36.

When recording and/or reproducing information on or from the recording layer 100a on the upper surface of the optical disk 100, using the laser beam output from the laser diode 14 of the housing 10 shown in FIG. 1A via the prism assembly 18, the optical disk 100 is rotated in a predetermined direction at a predetermined rotation speed by means of a known rotation driving device (not shown). During this rotation, the housing 10 reciprocates around the output shaft 12 of the voice coil motor within a predetermined range. As a result, the objective lens 33 and the solid immersion lens 34, which are arranged at the terminal end of the slender chamber of the long arm 10a, are moved above the recording layer 100a of the upper surface of the optical disk 100, in a radial direction of the optical disk 100.

Further, the slider 35 which carries the objective lens 33 and the solid immersion lens 34, and the support spring 36 are flexible freely in up and down directions due to an elasticity of the support spring 36, as indicated in FIG. 1B by a solid line and a two-dot chain line. Consequently, the slider 35 which carries the objective lens 33 and the solid immersion lens 34, floats at a height in a range from about 100 nm to 150 nm with respect to the recording layer 100a of the upper surface of the optical disk 100 while the optical dish 100 is rotating as described above, due to a wind generated by the rotating optical disk 100.

The parallel laser beams having a circular cross section, which is projected on the recording layer 10a of the optical disk 100 via the objective lens 33 and the solid immersion lens 34 in order to record and/or reproduce information on or from the recording layer 100a on the upper surface of the optical disk 100, is reflected by the recording layer 100a, and after that, sent back to the prism assembly 18 via the solid immersion lens 34, the objective lens 33, the image lens device 30, the half prism 26, the Galvano mirror device 24 and the relay lens device 22. The reflected parallel laser beam having a circular cross section, which is returned to the prism assembly 18, is split into two by one of a plurality of beam splitters of the prism assembly 18. One of the split reflected parallel laser beams is guided to a beam transmitting hole formed in the inner wall of the short arm 10b, and then received by a photo-detector 38 for a servo control, provided in the beam transmitting hole. The other one of the split reflected parallel laser beam is guided to a beam transmitting hole made in the end wall of the short arm 10b, and then received by a photo-detector 40 for detecting an optical magnetic signal, provided in the beam transmitting hole.

When not recording and/or reproducing information on or from the recording layer 100a on the upper surface of the optical disk 100, using the laser light output from the laser diode 14 of the housing 10 shown in FIG. 1A, via the prism assembly 18, the support spring 36 is moved from an operation position indicated by the solid line in FIG. 1B to a rest position indicated by the two-dot chain line in FIG. 1B. The support spring 36 set at the rest position is received by a support receiver (not shown) having the same structure as to that of a known support spring receiver (not shown) for receiving the support spring of the arm which supports the magnetic head in the conventional hard disk device (not shown).

Next, the housing 10 is driven by the output shaft 12 of the voice coil motor such that the terminal end of the slender room of the long arm 10a, that is, the slider 35 which carries the objective lens 33 and the solid immersion lens 34, moves from a region above the recording layer 100a of the upper surface of the optical disk to an outer side of the optical disk 100 in its radial direction.

In this embodiment, a flexible substrate 42 is fixed onto the reinforcing rod 10d of the housing 10 while the substrate 42 is fixed onto the reinforcing plate 44. On the flexible substrate 42, various electrical circuits for operating various electrical and electronic parts in the housing 10 are formed, and each of the various electrical circuits includes an IC chip 43. These electrical circuits includes amplifiers, drivers and the like, for operating: the beforedescribed laser oscillating circuit (not shown) which is provided on the end wall of the short arm 10b of the housing 10; the monitoring photo-detector 20, the photo-detector 40 for detecting photo-magnetic signals, and the photo-detector for a servo control, provided on the outer wall, end wall, and inner wall of the short arm 10b of the housing 10; the Galvano mirror device 24 situated in the chamber at the intersecting region between the short and long arms 10b and 10a of the housing 10; and the monitoring photo-detector 28 situated in the slender chamber of the long arm 10a of the housing 10.

The reinforcing plate 44 is formed of, for example an aluminum plate and the like, and prevents the various electrical circuits, especially the IC chip 43, on the flexible substrate 42 from disconnecting.

The flexible substrate 42 has two check-lands 46. The check-lands 46 are used to check the electrical circuit formed on the flexible substrate 42 as to whether the circuit operates normally or not, or to check each of various electric and electronic parts on the housing 10, to which the respective electrical circuit is connected, as to whether the various parts normally operate or not. In the latter checking, it is checked whether the above-described laser oscillation circuit (not shown), the monitoring photo-detector 20, the photo-detector 40 for detecting photo-magnetic signals, the photo-detector 38 for a servo-control, the Galvano mirror device 24, the monitoring photo-detector 28 and the like, these of which are provided on the housing 10 to perform a near field recording, normally operate or not.

The check-lands 46 are used further to measure an output from the photo-detector 38 for a servo control, which is a type of the photo detectors which are a type of the optical elements, to adjust a position of the solid immersion lens 34, which is a type of the optical elements; to measure an output from the monitoring photo-detector 28, which is a type of the photo detectors, to adjust an inclining angle of a movable mirror of the Galvano mirror device 24, which is a type of the optical elements; and to check an erroneous displacement of an optical axis of any one of the optical elements, and the like.

A portion 42a of the flexible substrate 42 which includes the check-lands 46 is formed to project from the other portion which does not include the check-lands 46. In this embodiment, the other portion of the flexible substrate 42 which does not include the check-lands 46 corresponds to the reinforcing plate 44, that is, the other portion is overlaid on the reinforcing plate 44. And, the portion 42a which includes the check-lands 46 does not correspond to the reinforcing plate 44, that is, it is not overlaid on the reinforcing plate 44 and extends to an outer side of the reinforcing plate 44. As a result, the portion 42a of the flexible substrate 42 which includes the check-land 46 is flexible relative to the other portion which does not include the check-lands 46.

Next, with reference to FIGS. 2A and 2B, a check-land connecting device according to an embodiment of the present invention, which is used for electrically connecting a test device to the check-lands 46 on the flexible substrate 42 shown in FIG. 1A, will now be described.

Figure 2B:
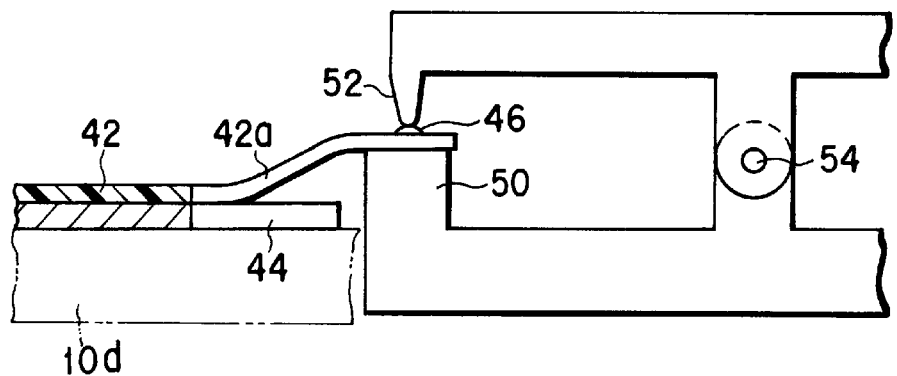
FIG. 2B is a side view schematically showing the check-land connecting device shown in FIG. 2A and the substrate with the check lands shown in FIG. 1A in a state in which a portion of the substrate surrounding the check-lands is warped by the check-land connecting device while connecting device connects the check-lands of the substrate as shown in FIG. 2A, a part of the substrate being cut out.

The check-land connecting device according to an embodiment of the present invention, such as shown in FIG. 2A is used to electrically connect a known test device to the check-lands 46 on the flexible substrate 42, the test device being used to check the above-mentioned various electrical circuits on the flexible substrate 42, the above-mentioned various electrical or electrical parts which connected to the above-mentioned various electrical circuits on the housing 10 to which the flexible substrate 42 is fixed, and the above-mentioned various optical elements on the housing 10.

As shown in FIG. 2A, the check-land connecting device comprises a table member 50 for supporting a lower surface of the portion 42a of the flexible substrate 42, which includes the check-lands 46, and a probe 52 which is applied from above onto the check-lands 46 on the upper surface of the portion 42a. The probe 52 is made of an electrically conductive material, and is electrically connected to the above described test device.

The table member 50 and the probe 52 are connected by a rotation center shaft 54 to be pivotable in up and down directions with relative to each other. With this structure, the probe 52 can be easily brought into contact with or separated from the check-lands 46 on the portion 42a of the flexible substrate 42 placed on the table member 50 by gripping a proximal end portion of the table member 50 and a proximal end portion of the probe 52 by one hand of an user, and moving them in the up and down directions.

Consequently, the before-described various checking operations can be performed easily in a short time.

In order to assure the electrical contact between a tip end of the probe 52 and the check-lands 46, a pressure of about several tens of grams per one probe 52, must be applied to the check-land 46 by the tip end of the probe 52. In this case, as shown in FIG. 2B, the portion 42a of the flexible substrate 42, which includes the check-lands 46, may be warped during the checking operation. Such warping of the portion 42a can occur due to a difference in height between an upper surface of a base (not shown) on which the housing 10 is placed during the checking operation, and the upper surface of the table member 50.

However, the load or pressure which causes the warping in the portion 42a of the flexible substrate 42, which includes the check-lands 46 as described above, is absorbed by the warping of the portion 42a, and the load will not be transmitted to the other portion of the flexible substrate 42, which does not include the check-lands 46.

Consequently, a warping in the other portion of the flexible substrate 42 than the portion 42a, and in the reinforcing plate 4, can be prevented. As a result, a disconnection of the electrical circuit on the other portion of the flexible substrate 42, which is reinforced by the reinforcing plate 44 and does not include the check-lands 46, especially disconnections of IC chips 43 included in the electrical circuit, is surely prevented.

Further, a warping of the housing 10 due to the warping of the other portion of the flexible substrate 42 excepting the portion 42a, and the warping of the reinforcing plate 44, is prevented. Therefore, it is possible to prevent various optical elements held in the housing 10, such as the laser diode 14, the condenser lens device 16, the prism assembly 18, the relay lens device 22, the Galvano mirror device 24, the half prism 26, the image lens device 30, the reflection mirror 32, the objective lens 33 and the solid immersion lens 34, from distorting, and also prevent the optical axis of any one of these optical elements from erroneously displacing. Consequently, it becomes possible to make accurate a check of the functions of these optical elements or a calibration of these elements.

After performing the above-mentioned various checking, the portion 42a of the flexible substrate 42, which includes the check-lands 46 may be separated from the other portion which does not include the check-lands 46, or it can be bend onto a lower surface of the reinforcing plate 44 and fixed to the lower surface of the reinforcing plate 44 by a fixing means such as an adhesive.

Next, with reference to FIGS. 3A and 3B, substrates with check-lands according to other embodiments of the present invention will now be described.

Figure 3A:
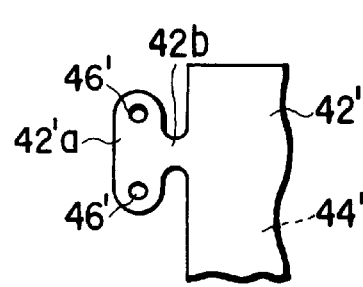
FIG. 3A is an enlarged plan view schematically showing a main portion of a substrate with two check-lands, the substrate according to another embodiment of the present invention.

In a flexible substrate 42' of the embodiment shown in FIG. 3A, a portion 42'a, which includes two check-lands 46', which projects from a reinforcing plate 44' and which does not correspond to the reinforcing plate 44', has a region 42b adjacent to the other portion corresponding to the reinforcing plate 44'. The region 42b is narrower in width than a region surrounding the check-lands 46'.

With the above-described structure, the portion 42'a of this embodiment has a sufficient flexibility not only in the up-and-down directions of the reinforcing plate 44 but also in the torsional direction around the region 42b.

Figure 3B:
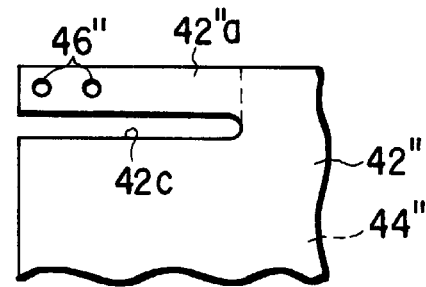
FIG. 3B is an enlarged plan view schematically showing a main portion of a substrate with two check-lands, the substrate according to still another embodiment of the present invention.

In a flexible substrate 42" of another embodiment shown in FIG. 3B, a portion 42"a, which includes two check-lands 46", which projects from a reinforcing plate 44" and which does not correspond to the reinforcing plate 44", is formed by notching a corner of the reinforcing plate 44" and making a slit 42c along with the notch in a corner of the flexible substrate 42". The slit 42c corresponds to the notch of the reinforcing plate 44".

The portion 42"a is not regarded as projecting independently from an outer periphery of the flexible substrate 42". Even after the completion of the checking operation, the portion 42"a of the flexible substrate 42" does not become an obstacle during the use of the apparatus having the housing 10 shown in FIG. 1A, on which the flexible substrate 42" is mounted.

Consequently, there is no necessity that the portion 42"a should be cut out from the portion which corresponds to the reinforcing plate 44", or that the portion 42"a should be bent over the lower surface of the reinforcing plate 44" and fixed onto the lower surface of the reinforcing plate 44" by means of fixing means such as an adhesive.

In the above-described various embodiments, the check-lands 46, 46' and 46" are provided respectively on the portions 42a, 42'a and 42"a of the flexible substrates 42, 42' and 42" respectively reinforced by the reinforcing plates 44, 44' and 44", the portions 42a, 42'a and 42"a not corresponding to the reinforcing plates 44, 44' and 44". According to the technical idea of the present invention, it is however possible to provide a check-land to a portion of a flexible substrate not reinforced by a reinforcing plate, the portion having a flexibility relative to the other portion which is fixed to the apparatus employing the flexible substrate. A check-land may be provided on a portion formed to have a flexibility with relative to a non-flexible substrate.

In all of the above-described embodiments, a substrate made of a material having a relatively high rigidity, such as epoxy resin or Bakelite, which is reinforced by glass fibers, can be used in place of the flexible substrate 42, 42' or 42". When using such a material, the reinforcing plates 44, 44' and 44" are becomes unnecessary. Even in the case where a substrate made of a material having a relatively high rigidity: by forming a portion of the substrate, which includes a check-land, to project narrowly from the other portion of the substrate, as in the case of the portion 42a of the flexible substrate 42 according to the embodiment shown in FIG. 1A; by forming a region of a check-land including portion of a substrate, which is located adjacent to the other portion of the substrate, to have a width narrower than that of the rest of the check-land including portion, as in the case of the narrow region 42b of the flexible substrate 42' of another embodiment shown in FIG. 3A; or by forming a slit in a corner of the substrate to make a portion of the substrate, which is located on the outer side of the slit, being used as a portion including a check-land, as in the case of the portion 42"a of the flexible substrate 42" of still another embodiment shown in FIG. 3B, it is possible to form a portion in the substrate, which has a low rigidity with respect to the other portion of the substrate, and has a flexibility. And, therefore, in this case an advantage similar to the case of any one of the above-described embodiments can be obtained.

As described above, the check-land including portion which is formed to have a flexibility, may be integrally formed with a non-flexible substrate, or it is also possible that the portion is formed separately from the non-flexible substrate, and then they are connected together.

A portion having a flexibility can be made by changing an outer shape, a thickness and/or a material from those of the other part in which the check-land is not provided.

Further in the present invention, the number of the check lands provided on the substrate is not limited to two as in the above described various embodiments. The number of check lands may be one or more than two.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A substrate with a check-land comprising:
   a substrate adapted to be fixed to a housing holding at least one optical element; and
   at least one check-land provided on the substrate;
   wherein a first portion of the substrate which includes the at least one check-land is flexible relative to a second portion of the substrate which does not include the at least one check-land; and
   wherein the first portion of the substrate is partially separated by a slit from the second portion of the substrate.

2. A substrate with a check-land according to claim 1, further comprising a reinforcing plate, and wherein the substrate is flexible and the reinforcing plate is attached to the second portion of the flexible substrate.

3. A substrate with a check-land according to claim 1, wherein the first portion of the substrate is formed integrally with the second portion of the substrate.

4. A substrate with a check-land comprising:
   a substrate adapted to be fixed to a housing holding at least one optical element; and
   at least one check-land provided on the substrate;

wherein a first portion of the substrate which includes the at least one check-land is flexible relative to a second portion of the substrate which does not include the at least one check-land; and wherein the at least one optical element includes a laser light source, and is used to record information on a recording layer of an optical disk and to reproduce information from the recording layer, by projecting a laser beam from the laser light source to the recording layer of the optical disk.

5. A substrate with a check-land according to claim 4, further comprising a reinforcing plate, and wherein the substrate is flexible and the reinforcing plate is attached to the second portion of the flexible substrate.

6. A substrate with a check-land according to claim 4, wherein the first portion of the substrate projects from the second portion of the be substrate.

7. A substrate with a check-land according to claim 4, wherein the first portion of the substrate is formed integrally with the second portion of the substrate.

8. A substrate with a check-land according to claim 4, wherein the first portion of the substrate comprises a connecting region that connects a region surrounding the at least one check-land to the second portion of the substrate, and wherein a dimension of an outline of the connecting region is smaller than a dimension of an outline of the region surrounding the at least one check-land.

9. A substrate with a check-land according to claim 4, wherein the first portion of the substrate is partially separated by a slit from the second portion of the substrate.

* * * * *